United States Patent Office 3,564,755
Patented Feb. 23, 1971

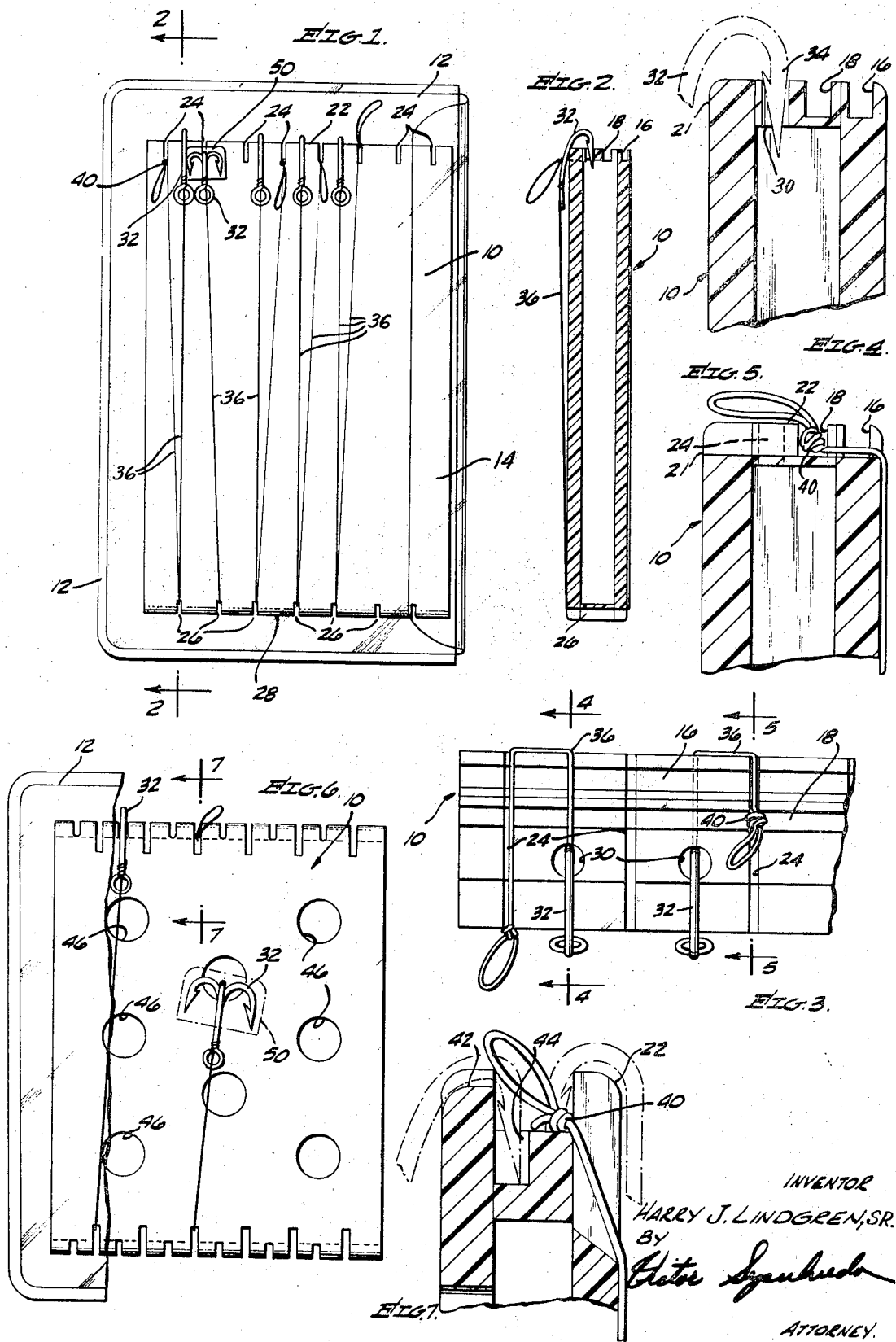

3,564,755
SNELLED FISHHOOK HOLDER
Harry J. Lindgren, Sr., Van Nuys, Calif., assignor to
Jane E. Johnson, Van Nuys, Calif.
Filed Oct. 31, 1969, Ser. No. 872,866
Int. Cl. A01k 97/06
U.S. Cl. 43—57.5
3 Claims

ABSTRACT OF THE DISCLOSURE

A snelled fishhook holder comprising a block of material having a plurality of positions in one end to receive the barbed end of a fishhook. The block of material is substantially rectangular in shape and has a plurality of guide slots in the end opposite the fishhook positions, to receive the fishhook leaders extending therethrough. A plurality of lateral grooves is provided across the one end justaposed to the positions for receiving the fishhooks and corresponding guide slots are provided in the one end corresponding to the guide slots on the opposite end of the block to receive knots in leaders extending around the block. Fishhook positions may be spaced along the flat surface of the block to accommodate other lengths of leader.

BACKGROUND OF THE INVENTION

(A) Field of the invention

This invention relates to snelled fishhook holders and more particularly to novel and improved fishhook holders which can accommodate snelled fishhooks of differing lengths of leaders and the like.

(B) Description of the prior art

Heretofore, a problem has been encountered by fishermen who prefer to use snelled fishhooks, that is, a fishhook which has a transparent leader or the like attached thereto. One of the problems in this type of snelled fishhook is that if the leaders are allowed to remain loose in the fishing box or the like, they have a tendency to become tangled and snarled with one another, and thus, should a person utilizing fishhooks need to replace the one which he is using, he would first have to untangle the hooks.

Some fishhook manufacturing and sales organizations include apparatus for keeping the snelled fishhooks in an organized manner by placing them in cardboard containers whereby the hook end is connected to one end of the container and the leader is attached to the bottom. These type devices, while useful for the sales and distribution of fishhooks, have many disadvantages for the fisherman, especially if he desires to carry his hooks in his pocket. These types of cardboard fishhook containers are easily destroyed and if they become wet have been known to easily tear and the fishhook thereafter lies loose in the fisherman's pocket or fishing box. On the other hand, these types of devices provide no real protection from the barbed end of the hooks and thus they are normally exposed, and therefore, may cause harm to individuals who are handling the hooks.

In the prior art, many attempts have been made to provide a useful and yet easily handled fishhook retainer which can accommodate snelled fishhooks so that they may be easily stored. Heretofore, these prior art devices included many devices for holding the fishhook and leaders in an organized manner, yet none of the prior art devices have provided one which will accommodate fishhooks with differing lengths of leaders, differing sizes of hooks, and yet keep the leaders completely confined within their retaining apparatus so that they do not become easily tangled.

It, therefore, becomes desirous to provide a novel and improved fishhook retaining apparatus which can accommodate fishhooks of different sizes and fishhooks having different leader lengths thereon can be easily placed into a shirt pocket. Further, when dropped into the water, it can float.

SUMMARY OF THE INVENTION

Briefly described, the present invention comprises a rectangular block of material having a plurality of lateral grooves across one end thereof. Slots are provided normal to the grooves on the other end of the block and corresponding slots are cut across the grooves on the said one end of the block. A plurality of positions is provided across the top of the material and positioned in relation to the lateral grooves and the slots normal therewith. The positioning means is adapted to receive the barbed end of the fishhook therein and any one of the slots is adapted to receive the leader from the fishhook when wrapped around the block of material.

DESCRIPTION OF THE DRAWINGS

These and other features and advantages will become more apparent to those skilled in the art when taken into consideration with the following detailed description wherein like reference numerals indicate like and corresponding parts throughout the several views and wherein:

FIG. 1 is a planned view illustrating the device in one embodiment in accordance with the principles of this invention;

FIG. 2 is a section view taken along the lines 2—2 of FIG. 1;

FIG. 3 is a top plan view of the device shown in FIG. 1;

FIG. 4 is a partially enlarged section view illustrating the position of the barbed end of a hook in its retaining member;

FIG. 5 is the enlarged view similar to FIG. 4 illustrating the positions of the leader within the slots therein;

FIG. 6 is a partial elevation view illustrating a second embodiment of this invention; and FIG. 7 is a partial section view taken along the lines 7—7 of FIG. 6 illustrating the positioning of the leader and the hook therein.

DESCRIPTION OF THE PREFERRED EMBODIMENT

Turning now to FIG. 1, there is shown the fish-hook retainer 10 in accordance with this invention and includes the retainer 10 positioned in a plastic envelope 12. The plastic envelope 12 may be of a clear material having opening in one end thereof and having a flap 14 which can be either tucked inside the opening or attached to the outside in a suitable manner. This plastic envelope 12 is shown as one embodiment. It should be set forth that this is only a convenient mode of practicing this invention.

The retainer 10 may be comprised of a plastic material which is substantially hollow inside. While in this mode of manufacturing the retainer 10 adds to its lightness, it could also be composed of solid material and still remain within the spirit and scope of this invention.

Referring to FIG. 2, there is shown two lateral grooves 16 and 18 cut longitudinally across the top portion 22 of the retaining member 10 but leaving an ungrooved end member 21 at one side thereof. These two grooves are cut across the entire width of the member 10 and at a depth sufficient to receive a portion of a leader as will be explained. While only two grooves are set forth herein, any number of lateral grooves may be provided and still remain within the teachings of this invention.

A plurality of slots 24 are cut across the top portion 22 of the block 10 and intersecting the grooves 16 and 18.

Matching slots 26 are cut in the opposite end of the block 10 on end 28 thereof. The slots 24 and the slots 26 are shown substantially offset from one another to facilitate receiving the leader of the fishhook, but the slots 26 may be, if desired, substantially aligned with the slots 24.

A plurality of fishhook barb positions 30, which may be as shown in FIG. 3, is comprised of a plurality of holes drilled into the top 22 of the member 10 and being substantially spaced between the slots 24.

In carrying out the principles of this invention, a fishhook 32 has its barbed end 34 positioned into one of the holes 30 with the hook bight disposed on end member 21 between a pair of slots 24. The snelled leader 36 thereof is then passed along one side of the retaining member 10, through a slot 26 in end 28, back along the other side of the retaining member and into one of the upper slots 24. Each leader has a knot 40 on one end thereof to make the usual loop in the leader for attaching to the fishline and the like. This knot can then be positioned within one of the grooves 16, 18 or adjacent the end member 21, depending upon the length of the leader. Thus, an accommodation is made for different sizes of fishhook leaders and assuring that they are tightly secured within the apparatus of this invention.

Referring now to FIG. 6, there is shown a different embodiment of this invention whereby the fishhooks 32 are positioned into saddles 42, as shown in FIG. 7. There may also be provided a hole or well 44 to hold the barbed end of the hook.

The saddle 42 may have a slot cut into the retainer 10 having a lower curvature which substantially resembles the curvature of the fishhook 32. By this embodiment, the strain placed on the hook 32 is at its curved portion rather than on the barbed tip. Such a feature of preventing the strain on the hook prevents the tip thereof from breaking or bending. Further, the advantage of the saddle 42 is that the fishhook fits more snugly into its area for better confinement thereof and prevents it from protruding substantially above the top portion 22 as does the fishhook shown in FIG. 4. Similar grooved arrangements may be provided for receiving the knot 40 of the leader 36, also by the arrangement shown in FIG. 6. Hooks 32 can be placed on either end of the retaining member 10 and thus a greater number of hooks can be placed in a single retainer.

Further, with reference to FIG. 6, a plurality of holes 46 may be provided on the surface of the member 10 in order to connect the fishhook 32 into a lower area on the body 10 and allow the leader to be looped about the body 10 a number of times to take the slack out of the leader should extroardinary long leaders be desired.

Referring again to FIG. 1, there is shown a protective device 50 which is adapted to protect a three prong fishhook. This particular device is readily available on the market and can easily be modified to be placed over two of the prongs and yet leave a third prong exposed to be connected into the retaining member.

While there has been described but one preferred embodiment of this invention, it should be understood that many alterations and modifications are contemplated and still remain within the spirit and scope of this invention.

What is claimed is:

1. In combination an apparatus useful with a fishhook which is attached to a snell, said snell terminating at its free end in a loop, a knot being located adjacent said loop for forming said loop, a retaining member comprising:
   a substantially rectilinear block having a first end and a second end and a front side and a back side;
   a plurality of laterally disposed grooves within said first end, one of said grooves being adapted to retain the barbed end of said fishhook;
   a plurality of first guide slots located within said first end and extending through a portion of said front side and said back side, said first guide slots intersecting said grooves substantially perpendicularly and being adapted to restrain said snell by said knot with said knot being located in one of said grooves;
   a plurality of second guide slots located within said second end, said second guide slots being substantially parallel to said first guide slots, both of said first and second guide slots being adapted to cooperate with said snell; and
   holes located along said first end and being closest to said front side with said holes being disposed between said guide slots, whereby each of said holes is adapted to receive the barbed end of a fishhook.

2. An apparatus as defined in claim 1 wherein said second guide slots are offset from said first guide slots, whereby the axis connecting each pair of cooperating first and second guide slots is not perpendicular to the surface of said grooves.

3. The apparatus as defined in claim 1 wherein each of said guide slots is formed with a saddle thereon, each of said saddles being convexly curved to facilitate cooperation with the curved portion of said fishhook.

References Cited

UNITED STATES PATENTS

| | | | |
|---|---|---|---|
| 595,998 | 12/1897 | Garland | 43—57.5(A) |
| 2,080,794 | 5/1937 | Squassoni | 43—57.5(A) |
| 2,595,463 | 5/1952 | Kamps | 43—57.5 |
| 2,730,833 | 1/1956 | Newell | 43—57.5 |
| 2,749,654 | 6/1956 | Harris | 43—57.5 |
| 2,826,856 | 3/1958 | Marion et al. | 43—57.5 |

OTHER REFERENCES

SAMUEL KOREN, Primary Examiner

D. J. LEACH, Assistant Examiner